United States Patent
Choi et al.

(10) Patent No.: US 9,620,261 B2
(45) Date of Patent: Apr. 11, 2017

(54) RESIN COMPOSITION FOR PRODUCING INSULATING MATERIAL AND METHOD FOR PRODUCING INSULATING MATERIAL

(71) Applicants: HYUNDAI MOTOR COMPANY, Seoul (KR); DYM Co., Ltd., Cheonan-si, Chungcheongnam-do (KR)

(72) Inventors: Seung Woo Choi, Seoul (KR); Dong Ha Park, Seongnam-si (KR); Baeg Yong Seong, Cheongju-si (KR); Eun Ho Choi, Cheonan-si (KR); Jong Seok Yang, Jeonju-si (KR)

(73) Assignees: HYUNDAI MOTOR COMPANY, Seoul (KR); DYM CO., LTD., Chungeheongnam-Do (KR)

( * ) Notice: Subject to any disclaimer, the term of this patent is extended or adjusted under 35 U.S.C. 154(b) by 0 days.

(21) Appl. No.: 14/617,330

(22) Filed: Feb. 9, 2015

(65) Prior Publication Data
US 2015/0248948 A1 Sep. 3, 2015

(30) Foreign Application Priority Data
Feb. 28, 2014 (KR) .................. 10-2014-0024074

(51) Int. Cl.
| C08K 9/06 | (2006.01) |
| H01B 3/44 | (2006.01) |
| H01B 7/295 | (2006.01) |
| C08K 3/22 | (2006.01) |
| C08K 5/36 | (2006.01) |

(52) U.S. Cl.
CPC ............ H01B 3/441 (2013.01); H01B 7/295 (2013.01); C08K 5/36 (2013.01); C08K 9/06 (2013.01); C08K 2003/2224 (2013.01)

(58) Field of Classification Search
CPC ..... C08K 5/36; C08K 9/06; C08K 2003/2224
See application file for complete search history.

(56) References Cited

FOREIGN PATENT DOCUMENTS

| KR | 11-140134 A | 5/1999 |
| KR | 10-2000-0061604 A | 10/2000 |
| KR | 10-2001-0061908 A | 7/2001 |
| KR | 10-0341112 B1 | 6/2002 |
| KR | 10-0729012 B1 | 6/2007 |
| KR | 10-0737615 B1 | 7/2007 |
| KR | 10-0782231 B1 | 12/2007 |
| KR | 10-2010-0002650 A | 1/2010 |
| KR | 10-2010-0092244 A | 8/2010 |

OTHER PUBLICATIONS

English language transation Korean 10-2010-0002650 (Jan. 2010), machine generated.*

* cited by examiner

*Primary Examiner* — Margaret Moore
(74) *Attorney, Agent, or Firm* — McDermott Will & Emery LLP

(57) ABSTRACT

A resin composition for producing an insulating material includes (A) 40 to 50% by weight of a base resin formed with a polyolefin-based resin or a derivative thereof, (B) 40 to 50% by weight of a magnesium hydroxide flame retardant of which surface is treated with vinyl silane, (C) 1 to 2% by weight of an antioxidant in which a first antioxidant and a second antioxidant are mixed in a weight ratio of 1:1 to 3, (D) 0.5 to 2% by weight of a lubricant, (E) 2 to 3% by weight of organosilane, (F) 0.05 to 0.2% by weight of an initiator, and (G) 1 to 4% by weight of a catalyst.

7 Claims, 1 Drawing Sheet

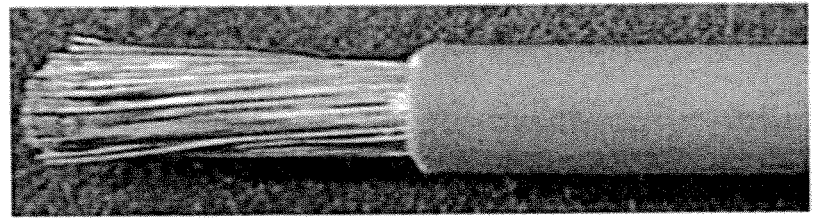
THERMAL CLASS 150°C, MOISTURE CROSS-LINKING CABLE COVERING MATERIAL
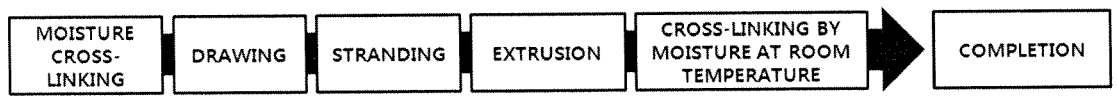

RESIN COMPOSITION FOR PRODUCING INSULATING MATERIAL AND METHOD FOR PRODUCING INSULATING MATERIAL

CROSS-REFERENCE TO RELATED APPLICATION

This application claims under 35 U.S.C. §119(a) the benefit of priority to Korean Patent Application No. 10-2014-0024074 filed on Feb. 28, 2014, the entire contents of which are incorporated herein by reference.

TECHNICAL FIELD

The present disclosure relates to a resin composition for producing an insulating material and a method for producing the same. More particularly, the present disclosure relates to a resin composition for producing an insulating material having excellent physical properties such as flame retardancy, oil resistance, and tensile strength. These properties are capable of satisfying a heat resistant temperature of 150° C. (CLASS D) by moisture cross-linking the resin composition. Predetermined amounts of a magnesium hydroxide flame retardant of which surface is treated with vinyl silane, a first antioxidant, and a second antioxidant are mixed in a specific ratio in the composition without using halogen which is an environmental pollutant. Thus, workability and flame retardancy of the insulating material for preparing a cable and the like, and a method for producing the insulating material can be improved.

BACKGROUND

Various polymer materials have been used for cables and the like in order to provide electric insulation. The polymer materials for the cables require proper electrical properties and durability to continuously provide initial performance. Particularly, the cables used for vehicles require high mechanical properties, high thermal resistance, high flame retardancy, abrasion resistance, and the like. Cable manufacturers have improved productivity by increasing cable extrusion rate, therefore, cover materials of automotive cables need to satisfy extrusion processability as well as the required properties described above.

Currently used automotive cables are classified by CLASS A (continuous operating temperature of 80° C., PVC) and CLASS B (continuous operating temperature of 100° C., cross-linked PVC) according to ISO 6722, an automotive international standard. However, cables of CLASS C (continuous operating temperature of 120° C.) or CLASS D (continuous operating temperature of 150° C.) having a more severe heat resisting condition need to be used since engine components generates high heat.

CLASS C mostly uses a cross-linked polyolefin (cross-linked PO; XL-PO)-based resin in which a polyolefin-based copolymer resin such as a polyethylene(PE) resin or an ethylene vinyl acetate resin is irradiated by an electron beam and cross-linked, and CLASS D or higher uses a fluorine-based resin and a silicone-based resin having a very excellent thermal resistance. However, the resins used for CLASS D are high-priced, and molding such as extrusion is not simple.

Accordingly, in the related art, flame retardancy has been enhanced by adding a large quantity of flame retardants since polyolefin-based resins themselves have high combustibility, however, there is a decrease in mechanical and physical properties. CLASS C (continuous operating temperature of 120° C.) has been domestically commercialized in some countries, however, the use of CLASS D (continuous operating temperature of 150° C.) material has not been developed. As a result, the development of insulating materials of CLASS D for automotive cables having low costs and simple extrusion molding at an ultrahigh speed of 1,000 MPM or higher is necessary.

Moreover, the use of halogens, heavy metals, and the like has been inactive due to their impact on environment pollution. The use of a decabromodiphenylether (commonly called as decabro, DBDE) brome-based flame retardant exhibiting relatively superior flame retardancy in a polychloride vinyl (PVC) or polyolefin resin are banned in several European countries as the material may generate dioxin.

Automotive cable industries are actively coping with globally reinforced environment regulations. For example, in Europe, restriction of hazardous substances (RoHS), sales of electrical and electronic products using 6 hazardous materials (Pb, Cd, Cr6+, Hg, polybrominated biphenyl (PBB), Polybrominated Diphenyl Ethers (PBDEs)) are banned from Jul. 1, 2006. In US, the use of PBDEs, a flame retarding material, is restricted from 2008. In Japan, J-MOSS is implemented from 2006, environment regulation is reinforced, and in Korea, "ecomark" labelling system, is reinforced on environmental friendly products and the like.

Accordingly, metal hydroxides such as aluminum hydroxide ($Al(OH)_3$) and magnesium hydroxide ($Mg(OH)_2$) or phosphorous-based flame retardants have been used.

Korean Patent No. 341112 relates to a polyolefin flame retarding and insulating composition for high temperature, and in particular, an insulating material for high temperature having improved thermal resisting properties in polyolefin-based non-toxic (non-halogen) flame retarding materials used for insulating materials and the like. Specifically, in the composition, a hindered phenol-based antioxidant is added in 0.1 to 10 parts by weight, a thioester-based antioxidant in 0.1 to 5 parts by weight, a phenol-based metal non lubricant in 0.1 to 5 parts by weight, a benzimidazole-based or its zinc salt-based antioxidant in 0.1 to 20 parts by weight, and a hindered amine-based stabilizer in 0.1 to 5 parts by weight with respect to 100 parts by weight of the resin mixed with one type or 2 to 4 types of polyolefin-based resins. An inorganic flame retardant of which surface is treated with vinyl silane is used in 80 to 150 parts by weight with respect to 100 parts by weight of the resin, and a flame retardant aid is used in 1 to 50 parts by weight with respect to 100 parts by weight of the resin. However, this insulating composition is an irradiation cross-linking type and has high initial investment costs, thereby limiting the use of a moisture cross-linking type.

Korean Patent No. 729012 discloses a moisture cross-linking flame retardant resin composition for producing an insulating material as an inorganic flame retardant formed with magnesium hydroxide and aluminum hydroxide of which surface is treated with any one material selected from among vinyl silane, stearic acid, oleic acid, aminopolysiloxane, and a polymer resin. However, when these materials are applied for cables, oil resistance capable of enduring in severe conditions is not high, and a large quantity of non-halogen-based flame retardant is used in order to provide a high degree of flame retardancy, therefore lacking thermal resistance and flexibility since properties such as specific gravity, hardness, and flection, and thus, causing cracks.

For that reason, an insulating material composition for cables having high thermal resistance in which halogen elements are not included and having excellent properties such as mechanical properties, high thermal resistance, high flame retardancy, and abrasion resistance is necessary.

The above information disclosed in this Background Art section is only for enhancement of understanding of the background, and therefore, it may contain information that does not form the prior art that is already known in this country to a person of ordinary skill in the art.

SUMMARY OF THE DISCLOSURE

The present disclosure has been made in an effort to solve the above-described problems associated with prior art. An aspect of the present inventive concept provides an insulating material for automotive cables having excellent physical properties such as flame retardancy, oil resistance, and tensile strength capable of satisfying a heat resistant temperature of 150° C. (CLASS D), which may be produced by moisture cross-linking of the resin composition. The insulating material for automotive cables according to the present disclosure includes predetermined amounts of a magnesium hydroxide flame retardant of which surface is treated with vinyl silane, a first antioxidant, and a second antioxidant in a specific ratio without using halogen.

Another aspect of the present inventive concept provides a method for producing the insulating material for automotive cables using the resin composition.

According to an exemplary embodiment of the present inventive concept, a resin composition for producing an insulating material including (A) 40 to 50% by weight of a base resin formed with a polyolefin-based resin or a derivative thereof; (B) 40 to 50% by weight of a magnesium hydroxide flame retardant of which surface is treated with vinyl silane; (C) 1 to 2% by weight of an antioxidant in which a first antioxidant and a second antioxidant are mixed in a weight ratio of 1:1 to 3; (D) 0.5 to 2% by weight of a lubricant; (E) 2 to 3% by weight of organosilane; (F) 0.05 to 0.2% by weight of an initiator; and (G) 1 to 4% by weight of a catalyst.

According to another exemplary embodiment of the present inventive concept, a method for producing an insulating material includes (i) mixing and kneading 40 to 50% by weight of a base resin formed with a polyolefin-based resin or a derivative thereof, 40 to 50% by weight of a magnesium hydroxide flame retardant of which surface is treated with vinyl silane, 1 to 2% by weight of an antioxidant in which a first antioxidant and a second antioxidant are mixed in a weight ratio of 1:1 to 3, 0.5 to 2% by weight of a lubricant, 2 to 3% by weight of organosilane, and 0.05 to 0.2% by weight of an initiator. (ii) A silane-grafted copolymer is prepared by graft reacting the kneaded mixture. (iii) A compound is prepared by extruding the silane-grafted copolymer. (iv) A catalyst prepared in a master batch form is mixed with the compound and then is extrusion molded. (v) The extruded extrudate is moisture cross-linked for 2 to 6 hours in water of which temperature is maintained at 80 to 90° C.

The insulating material for automotive cables may use the production method

By using the resin composition for producing an insulating material according to the present disclosure, a composite material capable of satisfying CLASS D (continuous operating temperature of 150° C.) according to international standard ISO 6722 for automotive cables may be prepared. In addition, the polymer composite material presents excellent extrusion molding properties, high thermal resistance, and high flame retardancy and is environment friendly since environment-friendly flame retarding materials that do not include halogen elements are used.

Consequently, the resin composition according to the present disclosure can be widely applied to cables such as for office machines, for cellular phones which require great thermal resisting properties, and for automotive cables requiring CLASS 4 (continuous operating temperature of 150° C.).

Other aspects and embodiments of the invention are discussed infra.

It is understood that the term "vehicle" or "vehicular" or other similar term as used herein is inclusive of motor vehicles in general such as passenger automobiles including: sports utility vehicles (SUV); buses, trucks; various commercial vehicles, watercraft including: a variety of boats and ships, aircraft, and the like, and the term includes hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated by the accompanying drawing which is given hereinbelow by way of illustration only, and thus are not limitative of the present disclosure.

FIG. 1 is an exemplary drawing showing a cable production process using moisture cross-linking according to the present disclosure.

It should be understood that the appended drawing is not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Hereinafter reference will now be made in detail to various embodiments of the present inventive concept, examples of which are illustrated in the accompanying drawing and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents, and other embodiments, which may be included within the spirit and scope of the invention as defined by the appended claims.

The present disclosure provides a resin composition for producing an insulating material including (A) 40 to 50% by weight of a base resin formed with a polyolefin-based resin or a derivative thereof; (B) 40 to 50% by weight of a magnesium hydroxide flame retardant of which surface is treated with vinyl silane; (C) 1 to 2% by weight of an antioxidant in which a first antioxidant and a second antioxidant are mixed in a weight ratio of 1:1 to 3; (D) 0.5 to 2% by weight of a lubricant; (E) 2 to 3% by weight of organosilane; (F) 0.05 to 0.2% by weight of an initiator; and (G) 1 to 4% by weight of a catalyst.

The resin composition for producing the insulating material according to the present disclosure is for a cable cover, specifically, cables used for vehicles, or any composition commonly used in the art for these applications corresponds to the resin composition of the present disclosure.

The base resin included in the present disclosure is used for enhancing cable properties such as mechanical properties, electrical properties, and appearances, and is not limited as to a base resin commonly used in the art for this purpose, however, in this exemplary embodiment, an ethylene α-olefin copolymer, polyethylene, an ethylene vinyl acetate copolymer, or a mixture thereof are used. The amount used may be 40 to 50% by weight with respect to the total weight of the resin composition. When the amount of the base resin is less than 40% by weight, properties such as tensile strength and insulation resistance cannot be satisfied, and when the amount is greater than 50% by weight, desired flame retardancy may not be obtained.

The ethylene α-olefin copolymer, a material capable of being used as the polyolefin or the derivative thereof, may have a melt flow index (MFR) of 0.5 to 5.0 g/10 min at 190° C. and Mooney viscosity (ML 1+4(100)) of 10 to 70, and the linear low density polyethylene may have a melt flow index of 2.0 to 5.0 g/10 min at 190° C. and density of 0.910 to 0.940 g/cm$^3$.

The magnesium hydroxide flame retardant of which surface is treated with vinyl silane is a non-halogenated inorganic flame retardant, and thus, the magnesium hydroxide is used to facilitate a graft reaction of reactants in a moisture cross-linking reaction. In addition, the flame retardant may be used in 40 to 50% by weight with respect to the total weight of the resin composition. When the amount of the flame retardant is less than 40% by weight, flame retardancy is difficult to be obtained. When the amount is greater than 50% by weight, the viscosity of the composition materials increases together with the rapid decrease of tensile strength, elongation, thermal resistance, and the like since excessive inorganic substances are included, which decreases processability.

The antioxidant is a mixture of the first antioxidant and the second antioxidant in a weight ratio of 1:1 to 3, and may be used in 1 to 2% by weight with respect to the total weight of the resin composition.

The first antioxidant is one or more types of phenol-based antioxidants selected from the group consisting of pentaerythrityl-tetrakis[3-(3,5-di-tert-butyl-4-hydroxyphenyl)-propionate], 2,2'-thiodiethylbis-[3-(3,5-di-tert-butyl-4-hydroxyphenyl)-propionate], octadecyl-3-(3,5-di-tert-butyl-4-hydroxyphenyl)propionate, 4,4'-thiobis(6-tert-butyl-m-cresol), triethylene glycol-bis-3(3-tert-butyl-4-hydroxy-5-methyl phenyl)propionate, 4,4'-thiobis[2-(1,1-dimethylethyl)-5-methylphenol, and tetrakis[methylene(3,5-di-tert-butyl-4-hydroxy)cinnamate]methane.

For the second antioxidant, one or more types of thio-based compounds selected from the group consisting of 3,3"-thiobis[propanoic acid], distearyl thiodipropionic acid, and pentaerythritol beta-laurylthiopropionic acid are used.

In the thio-based compound, there is no efflorescence phenomena, and thus, thio-based compounds may be used. An efflorescence phenomenon such as a blooming phenomenon may occur when phosphorous-based antioxidants such as phosphorous acid 2,4-di-tert-butylphenol, nonylphenyl phosphorous acid, and tetrakis(2,4-di-tert-butylphenyl)-1,1-biphenyl-4,4'-diylbisphosphonite are used due to a decrease in the molecular weight by decomposition of the phosphorous-based antioxidants with moisture.

Herein, using the mixture of the first antioxidant and the second antioxidant in a weight ratio of 1:1 to 3 may be applied due to high thermal resistance. When the ratio of the first antioxidant is less than 1:1 with respect to the second antioxidant, the heat resistant temperature of 150° C. (CLASS D) is not satisfied, and when the ratio is greater than 1:3, the blooming phenomenon may occur.

The lubricant increases the processability by reducing the viscosity of the resin composition for producing the insulating material. One, two, or more types of wax series compounds such as polyethylene (PE) wax and paraffin wax, and stearic acid series compounds such as magnesium stearate and potassium stearate may be mixed and used. In addition, the lubricant may be used in 0.5 to 2% by weight with respect to the total weight of the resin composition. If the amount of the lubricant is less than 0.5% by weight, desired processability cannot be achieved, and when the amount is greater than 2% by weight, the flame retardant may impede uniform dispersion.

The organosilane forms a web structured composite such as a cross-linking bond with the base resin. Any organosilane commonly used in the art for this purpose may be used, however, the exemplary embodiment includes vinyltrimethoxysilane, vinyltriethoxysilane, tetraethoxysilane, tetra-n-propoxysilane, methyl-triethoxysilane, methyltrimethoxysilane, methyltri(2-methoxyethoxy)silane, 3-methacryloyloxypropyl-trimethoxysilane, 3-mercaptopropyl-trimethoxysilane, 3-aminopropyl-trimethoxysilane, 3-glycidyloxypropyl-trimethoxysilane, or a mixture thereof, and the amount used may be 2 to 3% by weight with respect to the total weight of the resin composition. When the amount of the organosilane is less than 2% by weight, the resin composition may be in a non-cross-linking state due to the decrease of cross-linking degree of the polyolefin or the derivative thereof, and when the amount is greater than 5% by weight, the dispersion is reduced by affecting the dispersion of the inorganic flame retardant thereby keeping the resin composition from grafting.

The initiator initiates a polymerization reaction or a graft reaction, of the resin composition for producing the insulating material, and any initiator commonly used in the art for this purpose may be used. However, the exemplary embodiment includes t-butyl cumyl peroxide, benzoyl peroxide, cumene hydroperoxide, dicumyl peroxide, methyl ethyl ketone peroxide, 2,5-dimethyl-2,5-di(tert-butylperoxy)hexane, di-tert-butyl peroxide, t-butyl peroxybenzoate, α,α'-bis(tert-butylperoxyisopropyl)benzene, di-isopropylbenzene, or a mixture thereof. Moreover, the initiator may be used in 0.05 to 0.2% by weight with respect to the total weight of the resin composition. When the amount of the initiator is less than 0.05% by weight, the moisture cross-linking does not occur, and when the amount is greater than 0.2% by weight, an over-cross-linking phenomenon may generate bumps.

The catalyst according to the present disclosure is for a moisture cross-linking reaction of the resin composition for producing the insulating material, and any catalyst commonly used in the art for this purpose may be used. In the exemplary embodiment, dibutyl tin dilaurate is used, and the amount of the catalyst may be 1 to 4% by weight with respect to the total weight of the resin composition. When the amount of the catalyst is less than 1% by weight, moisture cross-linking may not progress due to the non-dispersion of the catalyst, and when the amount is greater than 4% by weight, the moisture cross-linking may not progress since the catalyst is gathered into one place.

Herein, the catalyst may be mixed with the resin composition for producing the insulating material according to the present disclosure. Or the catalyst may be added during the moisture cross-linking reaction after being prepared in a master batch form separated from other resin compositions for producing the insulating material.

As one embodiment, the resin compositions for producing an insulating material other than the catalyst are prepared by graft-reacting the organosilane and the initiator among the compositions with the base resin, and then, the catalyst is prepared in the master batch form. The compositions and the catalyst are mixed to be used.

The resin composition for producing the insulating material having such a constitution according to present disclosure, and a method for producing the same are as follows.

In addition, the resin composition for producing the insulating material according to the present disclosure may include one or more types of functional additives selected from the group consisting of an ultraviolet (UV) stabilizer, a metal antioxidant, a lubricant, a flame retardant aid, and an anti-blooming agent. The additives are components commonly used in the related field, and the selective use and the content of these additives are not particularly limited in the present disclosure.

The method for producing an insulating material according to the present disclosure includes a step of mixing and kneading a base resin of 40-50% by weight formed with a polyolefin-based resin or a derivative thereof, a magnesium hydroxide flame retardant of which surface is treated with vinyl silane, an antioxidant of 1 to 2% by weight in which a first antioxidant and a second antioxidant are mixed in a weight ratio of 1:1 to 3, a lubricant of 0.5 to 2% by weight, organosilane of 2 to 3% by weight, and 0 an initiator of 0.05 to 0.2% by weight. A silane-grafted copolymer is prepared by graft reacting the kneaded mixture. A compound is prepared by extruding the silane-grafted copolymer. Catalyst prepared in a master batch form is mixed to the compound and extrusion-molded. The extruded extrudate is moisture cross-linked for 2 to 6 hours in water of which temperature is maintained at 80 to 90° C.

Herein, the step of preparing the silane grafted copolymer may be carried out by kneading for 15 to 25 minutes at a temperature condition of 180 to 220° C., and the step of preparing the compound may be carried out under an extrusion temperature condition of 150 to 180° C. using an extruder. Furthermore, the step of mixing the catalyst may employ common methods used in the art, and the catalyst herein is used in 1 to 4% by weight with respect to the total weight of the resin composition for producing the insulating material.

Moreover, the step of mixing the catalyst uses a monoaxial type with one screw, and the temperature of a cylinder section ranges from 150 to 190° C., and the temperature of a die in a head unit ranges from 180 to 210° C.

Accordingly, by using the resin composition for producing an insulating material according to the present disclosure, a composite material capable of satisfying CLASS D (continuous operating temperature of 150° C.) according to international standard ISO 6722 for automotive cables may be prepared. FIG. 1 shows an exemplary drawing of a cable production process using the moisture cross-linking according to the present disclosure.

EXAMPLES

Hereinafter, the present disclosure is described in more detail with reference to examples. However, these examples are for illustrative purposes only, and the scope of the present disclosure is not limited thereto.

Example 1

Referring to the following Table 1, a mixture was prepared by mixing, specifically, 28.2 g of an ethylene alpha-olefin copolymer (DF-810, Mitsui Chemicals, Inc., Japan) and 18.8 g of polyethylene (LDPE 2030, LG Chem, Ltd., Korea) as a base resin, 44.7 g of a magnesium hydroxide flame retardant of which surface is treated with vinyl silane (KISUMA 5P, Kyoywa Chemical Industry Co. Ltd., Japan), 0.6 g of a first antioxidant (ANOX-20, Chemtura, US) which is a phenol-based compound, 0.9 g of a second antioxidant (SEENOX 412S, ADEKA, Japan) which is a thio-based compound, 1 g of silicone oil (200 FLUID, DOW CORNING, US) as a lubricant, 2.6 g of vinyltrimethoxysilane (A-171, Evonik, US), 0.1 g of dicumyl peroxide (DCP, NOF Co., Japan), 3 g of a catalyst, and 0.1 g of a ultraviolet (UV) stabilizer.

Subsequently, the mixture was graft reacted by being kneaded for 20 minutes at a temperature of 190° C. in a 3 L/batch kneading apparatus [DISPERSION KNEADER, Fine Machinery Ind. Co., Ltd., Korea] to prepare a silane-grafted copolymer, and then produced as a compound by extrusion at 180° C. Next, a low density polyethylene (World Compound Co. Ltd., Korea) master batch including dibutyltin dilaurate [DBTDL, Air Product and Chemicals, Inc., US] was mixed with the compound. A result was extruded with an extruder having a diameter of 50 mm [EXTRUDER, Fine Machinery Ind. Co., Ltd., Korea] using a T-die under a temperature conditions of 150° C. for a hopper, 155° C. for a cylinder 1, 160° C. for a cylinder 2, and 190° C. for the die.

Next, the extruded T-die sheet was moisture cross-linked in water of which temperature was maintained at a temperature of 80 to 90° C. for 4 hours to produce an insulating material. The resin composition for producing the insulating material in Example 1 is as shown in the following Table 1.

TABLE 1

Composition Components and Configuration of Content thereof (Unit: g)

| Category | Raw Material | Example 1 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Base Resin | Resin A | 28.2 | 28.8 | 28.6 | 28.4 | 28.4 | 26.6 | 38.0 | 28.2 | 28.3 | 28.4 |
|  | Resin B | 18.8 | 19.2 | 19.2 | 19.0 | 18.9 | 18.4 | 9.5 | 18.8 | 18.9 | 18.9 |
| Flame Retardant | Flame Retardant A | 44.7 | 45.6 | 45.5 | 45.0 | 45.0 | 44.7 | 45.0 | 44.7 | 44.9 | 44.7 |
| First Antioxidant | Antioxidant A | 0.6 | 0.3 | 0.6 | 1.5 | 0.6 | 0.6 | 0.3 | 0.6 | 0.6 | 0.5 |
| Second Antioxidant | Antioxidant B | — | — | — | — | — | — | 1.0 | 0.9 | 0.5 | — |
|  | Antioxidant C | 0.9 | — | — | — | 0.3 | 3.0 | — | — | — | 0.6 |

TABLE 1-continued

Composition Components and Configuration of Content thereof (Unit: g)

| Category | Raw Material | Example 1 | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 |
|---|---|---|---|---|---|---|---|---|---|---|---|
| Lubricant | Lubricant A | 1.0 | 0.6 | 0.6 | 0.6 | 0.9 | 0.9 | 0.6 | 1.0 | 1.0 | 1.0 |
| Cross-linking Agent | Organosilane A | 2.6 | 2.3 | 2.3 | 2.3 | 2.7 | 2.6 | 2.4 | 2.6 | 2.6 | 2.7 |
| | Initiator A | 0.1 | 0.1 | 0.1 | 0.1 | 0.1 | 0.1 | 0.1 | 0.1 | 0.1 | 0.1 |
| Catalyst M/B | | 3.0 | 3.0 | 3.0 | 3.0 | 3.0 | 3.0 | 3.0 | 3.0 | 3.0 | 3.0 |
| Other Additives | UV Stabilizer A | 0.1 | 0.1 | 0.1 | 0.1 | 0.1 | 0.1 | 0.1 | 0.1 | 0.1 | 0.1 |
| Total | | 100 | 100 | 100 | 100 | 100 | 100 | 100 | 100 | 100 | 100 |

Names, and Descriptions of Raw Materials
Resin A [ethylene alpha-olefin copolymer, DF-810, Mitsui Chemicals Inc., Japan]
Resin B [polyethylene, LDPE 2030, LG Chem, Ltd., Korea]
Flame retardant A [magnesium hydroxide of which surface is treated with vinyl silane, Kisuma 5P, Kyoywa Chemical Industry Co. Ltd., Japan]
Antioxidant A [phenol-based compound, ANOX-20, Chemtura, US] first
Antioxidant B [phosphorous-based mixture, Everfox-168, Albemarle, US] second
Antioxidant C [thio-based mixture, SEENOX 412S, ADEKA, Japan] second
UV Stabilizer A [HALS-based mixture, Songnox 6220LD, Songwon Industrial Co. Ltd., Korea]
Lubricant A [Silicone oil, 200 FLUID, DOW CORNING, US]
Organosilane A [vinyltrimethoxysilane, A-171, Evonik, US]
Initiator A [dicumyl peroxide, DCP, NOF Co., Japan]
Catalyst M/B [low density polyethylene including 1% of catalyst A, World Compound Co., Ltd., Korea]
Catalyst A [dibutyl tin laurate [DBTDL, Air Product and Chemicals, Inc., US]

Comparative Examples 1 to 9

The composition was prepared in the same manner as in Example 1, and the components and the content thereof are as shown in Table 1.

Physical properties of the insulating material prepared in Example 1 and Comparative Examples 1 to 9, such as specific gravity, tensile strength, elongation, a bending test, thermal deformation, hardness, an oxygen index, combustibility, cold resistance, volume resistance, and blooming, were evaluated using methods according to test methods shown below, and results are shown in the following Table 2.

Test Examples

Test Example

Measurement of Physical Properties (1) Measurement of specific gravity: measured in accordance with ISO 1183.

(2) Measurement of tensile strength and elongation: measured at room temperature (23° C.) in accordance with ASTM D 638.

(3) Measurement of tensile strength and elongation: measured in accordance with ASTM D 638 after heating at 160° C. and 175° C. each.

(4) Measurement of thermal deformation: measured in accordance with KS M 3156 (Korean Industrial Standards for plasticized polyvinyl chloride compounds).

(5) Measurement of hardness: measured in accordance with ISO 868 under 1 atm at room temperature.

(6) Measurement of an oxygen index: flame retardancy of the material was measured in accordance with ISO 4589-2 and the oxygen index may be 23% or greater.

(7) Measurement of combustibility: measured in accordance with MS 300-08.

(8) Measurement of cold resistance: measured in accordance with KS M 3156.

(9) Measurement of volume resistance: measured in accordance with ASTM D 257.

(10) Observation of blooming: a phenomenon in which white powders occur on a surface was observed with the naked eye.

TABLE 2

Physical Property Measurement Results

| No. | Test Items | | Test method | Unit | Spec. | Example 1 | Comparative Example 1 | Comparative Example 2 | Comparative Example 3 | Comparative Example 4 |
|---|---|---|---|---|---|---|---|---|---|---|
| 1 | Specific Gravity | | ISO 1183 (Method A) | g/cm$^3$ | — | 1.266 | 1.265 | 1.264 | 1.267 | 1.265 |
| 2 | Room Temperature 23° C. (200 mm/min) | Tensile Strength | ASTM D 638 | N/mm$^2$ | — | 14.37 | 17.58 | 16.94 | 13.31 | 16.53 |
| | | Elongation | | % | — | 250 | 220 | 270 | 340 | 285 |
| 3 | After Heating (160° C., | Residual Tensile Strength | ASTM D 638 | % | — | 110.8 | 12.6 | 20.2 | Impossible to Measure (Melted) | 40.5 |

TABLE 2-continued

Physical Property Measurement Results

| | | | | | | | | | |
|---|---|---|---|---|---|---|---|---|---|
| 240 Hours) | Residual Elongation | | % | — | 84.0 | 4.5 | 8.0 | Impossible to Measure (Melted) | 30.5 |
| | Bending Test | | — | — | Pass | Crack | Crack | Impossible to Measure (Melted) | Crack |
| After Heating (175° C., 240 Hours) | Residual Tensile Strength | ASTM D 638 | % | — | 117.8 | 10.5 | 13.4 | Impossible to Measure (Melted) | 20.3 |
| | Residual Elongation | | % | — | 81.3 | 4.0 | 6.5 | Impossible to Measure (Melted) | 19.5 |
| | Bending Test | | — | — | Pass | Crack | Crack | Impossible to Measure (Melted) | Crack |
| 4 | Thermal Deformation (121° C., 1 kgf, 1 Hour) | KS M 3156 | % | 15 or less | 13 | 10 | 13 | 40 | 12 |
| 5 | Hardness (shore D) | ISO 868 | — | 50 ± 5 | 46 | 48 | 47 | 44 | 47 |
| 6 | Oxygen Index | ISO 4589-2 | — | 23 or greater | 26 | 25 | 25 | 25 | 25 |
| 7 | Combustibility | MS 300-08 | — | Self-extinguishing | Pass | Pass | Pass | Pass | Pass |
| 8 | Cold Resistance | KS M 3156 | ° C. | −40 or less | Pass | Pass | Pass | Pass | Pass |
| 9 | Volume Resistance | — | MΩm | $1.0 \times 10^4$ or greater | $1.1 \times 10^6$ | $1.1 \times 10^6$ | $1.1 \times 10^6$ | $1.1 \times 10^6$ | $1.1 \times 10^6$ |
| 10 | Blooming | — | — | Expected to be No | No | No | No | No | No |
| Pass/Fail | | | | | Pass | Fail | Fail | Fail | Fail |

| | | | | | Measurement Results | | | | |
|---|---|---|---|---|---|---|---|---|---|
| No. | Test Items | Test method | Unit | Spec. | Comparative Example 5 | Comparative Example 6 | Comparative Example 7 | Comparative Example 8 | Comparative Example 9 |
| 1 | Specific Gravity | ISO 1183 (Method A) | g/cm³ | — | 1.270 | 1.270 | 1.265 | 1.264 | 1.265 |
| 2 | Room Temperature 23° C. (200 mm/min) | Tensile Strength | ASTM D 638 | N/mm² | — | 13.2 | 16.7 | 16.45 | 16.38 | 16.27 |
| | | Elongation | | % | — | 300 | 250 | 260 | 280 | 300 |
| 3 | After Heating (160° C., 240 Hours) | Residual Tensile Strength | ASTM D 638 | % | — | 109.8 | 118.2 | 106.3 | 127.0 | 127.0 |
| | | Residual Elongation | | % | — | 85.6 | 94.7 | 94.2 | 85.7 | 88.3 |
| | | Bending Test | | — | — | Pass | Pass | Pass | Pass | Pass |
| | After Heating (175° C., 240 Hours) | Residual Tensile Strength | ASTM D 638 | % | — | 113.1 | 25.9 | 29.3 | 28.5 | 40.5 |
| | | Residual Elongation | | % | — | 83.5 | 8.0 | 15.7 | 13.5 | 30.2 |
| | | Bending Test | | — | — | Pass | Crack | Crack | Crack | Crack |
| 4 | Thermal Deformation (121° C., 1 kgf, 1 Hour) | KS M 3156 | % | 15 or less | 13 | 13 | 12 | 12 | 12 |
| 5 | Hardness (shore D) | ISO 868 | — | 50 ± 5 | 45 | 45 | 47 | 47 | 47 |
| 6 | Oxygen Index | ISO 4589-2 | — | 23 or greater | 25 | 28 | 28 | 26 | 26 |
| 7 | Combustibility | MS 300-08 | — | Self-extinguishing | Pass | Pass | Pass | Pass | Pass |
| 8 | Cold Resistance | KS M 3156 | ° C. | −40 or less | Pass | Pass | Pass | Pass | Pass |
| 9 | Volume Resistance | — | MΩm | $1.0 \times 10^4$ or greater | $1.1 \times 10^6$ | $1.1 \times 10^6$ | $1.1 \times 10^6$ | $1.1 \times 10^6$ | $1.1 \times 10^6$ |
| 10 | Blooming | — | — | Expected to be No | Yes | Yes | Yes | No | No |
| Pass/Fail | | | | | Fail | Fail | Fail | Fail | Fail |

As shown in Table 2, the resin composition of Example 1 shows better physical property values for residual tensile strength, residual elongation, and the bending test after heating due to the proper use of the components compared to the compositions in Comparative Examples 1 to 9 in which the components range outside the present disclosure. Therefore, the resin composition according to the present disclosure may endure in more severe conditions compared to the resin compositions according to comparative examples since the composition according to the present disclosure presented high thermal resistance and high flame retardancy.

Furthermore, in Comparative Example 4, which includes the composition according to the present disclosure but mixed ratio of the first antioxidant and the second antioxidant is different, a blooming phenomenon, a phenomenon in which white powders occur on the surface, was not shown. However, it was demonstrated that thermal resistance was lacking, and in Comparative Example 5, the thermal resistance was secured, however, the blooming phenomenon was observed. That is, when the mixed ratio of the first antioxidant and the second antioxidant is outside the range of 1:1 to 3, the blooming phenomenon may occur, or the thermal resistance is lacking.

In addition, when a phosphorous-based compound is used as the second antioxidant as in Comparative Examples 6 and 7, an efflorescence phenomenon may occur since the molecular weight decreases due to the decomposition of the compound with moisture.

Accordingly, it can be seen that the resin composition according to the present disclosure may lead to the most optimal insulating material when the first antioxidant and the second antioxidant are mixed in the ratio according to the present disclosure.

The resin composition for producing an insulating material according to the present disclosure has excellent extrusion molding properties, high thermal resistance, and high flame retardancy satisfying CLASS C (continuous operating temperature of 120° C.) and CLASS D (continuous operating temperature of 150° C.) according to ISO 6722.

The disclosure has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A resin composition for producing an insulating material comprising:
    (A) 40 to 50% by weight of a base resin formed with a polyolefin-based resin or a derivative thereof;
    (B) 40 to 50% by weight of a magnesium hydroxide flame retardant of which surface is treated with vinyl silane;
    (C) 1 to 2% by weight of an antioxidant in which a first antioxidant and a second antioxidant are mixed in a weight ratio of 1:1 to 3;
    (D) 0.5 to 2% by weight of a lubricant;
    (E) 2 to 3% by weight of organosilane;
    (F) 0.05 to 0.2% by weight of an initiator; and
    (G) 1 to 4% by weight of a catalyst,
    wherein the second antioxidant is one or more types of thio-based compounds selected from the group consisting of 3,3"-thiobis[propanoic acid], distearyl thiodipropionic acid, and pentaerythritol beta-laurylthiopropionic acid.

2. The resin composition for producing an insulating material of claim 1, wherein the base resin (A) is an ethylene α-olefin copolymer, polyethylene, an ethylene vinyl acetate copolymer, or a mixture thereof.

3. The resin composition for producing an insulating material of claim 1, wherein the first antioxidant is one or more types of phenol-based antioxidants selected from the group consisting of pentaerythrityl-tetrakis[3-(3,5-di-tert-butyl-4-hydroxyphenyl)-propionate], 2,2'-thiodiethylbis-[3-(3,5-di-tert-butyl-4-hydroxyphenyl)-propionate], octadecyl-3-(3,5-di-tert-butyl-4-hydroxyphenyl)propionate, 4,4'-thiobis(6-tert-butyl-m-cresol), triethyleneglycol-bis-3(3-tert-butyl-4-hydroxy-5-methylphenyl)propionate, 4,4'-thiobis[2-(1,1-dimethylethyl)-5-methyl-phenol, and tetrakis[methylene(3,5-di-tert-butyl-4-hydroxy)cinnamate]-methane.

4. The resin composition for producing an insulating material of claim 1, wherein the organosilane (E) is vinyltrimethoxysilane, vinyltriethoxysilane, tetraethoxysilane, tetra-n-propoxysilane, methyl-triethoxysilane, methyltrimethoxysilane, methyltri(2-methoxyethoxy)silane 3-methacryloyloxypropyl-trimethoxysilane, 3-mercaptopropyl-trimethoxysilane, 3-aminopropyl-trimethoxysilane, 3-glycidyloxypropyl-trimethoxysilane, or a mixture thereof.

5. The resin composition for producing an insulating material of claim 1, wherein the initiator (F) is t-butyl cumyl peroxide, benzoyl peroxide, cumene hydroperoxide, dicumyl peroxide, methyl ethyl ketone peroxide, 2,5-dimethyl-2,5-di(tert-butylperoxy)hexane, di-t-butyl peroxide, t-butyl peroxybenzoate, α,α'-bis(tert-butylperoxyisopropyl)benzene, di-isopropylbenzene, or a mixture thereof.

6. The resin composition for producing an insulating material of claim 1, wherein the catalyst (G) is dibutyl tin dilaurate and prepared in a master batch form.

7. The resin composition for producing an insulating material of claim 1, further comprising one or more types of functional additives selected from the group consisting of an ultraviolet (UV) stabilizer, a metal antioxidant, a lubricant, a flame retardant aid, and an anti-blooming agent.

* * * * *